United States Patent [19]

Lee

[11] Patent Number: 4,621,294
[45] Date of Patent: Nov. 4, 1986

[54] CONTRAST ENHANCING OPTICAL COUPLING PAD FOR PROJECTION TV

[75] Inventor: Sae D. Lee, Buffalo Grove, Ill.

[73] Assignee: Zenith Electronics Corporation, Glenview, Ill.

[21] Appl. No.: 595,085

[22] Filed: Mar. 30, 1984

[51] Int. Cl.⁴ .............................................. H04N 5/74
[52] U.S. Cl. .................................... 358/237; 358/60; 358/64; 220/2.1 A
[58] Field of Search .................. 358/237, 64, 60, 250; 313/478, 473, 474; 220/2.1 A, 2.3 A

[56] References Cited

U.S. PATENT DOCUMENTS

| | | | |
|---|---|---|---|
| 4,027,328 | 5/1977 | Lessman | 358/60 X |
| 4,151,554 | 4/1979 | Tucker | 358/60 |
| 4,163,990 | 8/1979 | Hodges | 358/60 X |
| 4,432,018 | 2/1984 | Futatsudera et al. | 220/2.1 A X |
| 4,511,927 | 4/1985 | Bauer | 358/250 |

Primary Examiner—James J. Groody
Assistant Examiner—E. Anne Toth
Attorney, Agent, or Firm—Cornelius J. O'Connor

[57] ABSTRACT

An image projection system using a projection type cathode ray tube and lens element. The improvement being a direct optical coupling between the display surface and the lens element comprised of a transparent, compressible, multi-layer, resin formulated pad wherein the outer layer of the pad are peelable.

5 Claims, 5 Drawing Figures

CONTRAST ENHANCING OPTICAL COUPLING PAD FOR PROJECTION TV

BACKGROUND OF THE INVENTION AND PRIOR ART STATEMENT

This invention relates in general to a projection television system utilizing a cathode ray tube in association with an optical lens, and is particularly concerned with means for enhancing the contrast of an image projected by the tube-lens arrangement.

A color projection television system of the type herein considered is disclosed and claimed in U.S. Pat. No. 4,376,949 which issued to William A. Rowe, and which is assigned to the assignee of the present invention. The Rowe patent is addressed to a system which employs three different monochrome picture tubes, which independently develops one of each of the three primary colors. The images formed by these tubes are projected through a lens arrangement to the end that a color image is displayed on a viewing screen.

U.S. Pat. No. 4,388,642 which issued to James J. Reno et al., and which is assigned to the assignee of the subject invention, albeit being addressed to a heat sink means for a projection CRT, depicts the manner in which a projection CRT is arranged to cooperate with an optical lens in a projection television system.

U.S. Pat. No. 4,405,949 which issued to Richard L. Hockenbrock et al, and which is assigned to the assignee of the subject invention, describes and claims a liquid cooled projection CRT. It is a projection CRT of this construction that the subject invention finds particular application for effecting a direct optical coupling between an image displaying the surface of that tube and an associated projection lens element.

U.S. Pat. No. 4,150,320 which issued to Robert B. Mitchell et al., is addressed to an integral lens cathode ray tube system comprising a tube having a spherically shaped viewing portion 9 and a glass panel 13 which is affixed to the viewing portion by an optically matched resin 11 to form an integrated optical interface providing a double concave lens configuration. It is suggested that the disclosed arrangement minimizes defocusing of an image from a spherically shaped CRT when directed upon a flat surface, as is the practice in a projection television system.

While the disclosure is silent in the matter, it would appear that if the CRT in this integrated arrangement should fail, in addition to the loss of the tube, the resin interface as well as glass panel 13, the second half of the double concave lens, would also have to be discarded.

Other known integrated projection tube arrangements utilizing a resin interface also have the aforementioned shortcoming, that is, failure of any one component results in loss of the entire package.

Aside from the foregoing, a particular problem characteristic in projection TV systems in which the developed image is air-coupled from the CRT face panel to the lens assembly is veiling glare. This glare is attributable to reflection of light rays from the surface of the face panel panel back to the inside wall of the panel immediately beneath the electroluminescent screen. The initial reflection is caused by virtue of the difference in index of refraction as between the glass material in the face panel and the air outside the panel wall.

In any event, it will be shown that when the aforementioned air gap is eliminated in accordance with the invention, veiling glare is substantially reduced and the contrast ratio in the image projected on the viewing screen is significantly improved.

OBJECTS OF THE INVENTION

It is a general object of the invention to provide an improvement for enhancing the contrast of the projected image of a projection television system.

It is a specific object of the invention to provide an improved arrangement for effecting a direct optical coupling between the display surface of a projection CRT and an associated lens element.

It is also an object of the invention to provide an improvement for an image projection system in which loss or damage to the CRT or the lens does not necessitate discarding an undamaged component of the system.

It is a further object of the invention to improve the index of refraction match between the display surface of a projection CRT and an element of a projection lens.

It is also an object of the invention to improve the contrast ratio in a projection television system by eliminating the air gap between the projection CRT display surface and an associated lens element by inserting an optical coupling pad therebetween.

It is a specific object of the invention to provide a resin formulated pad for optically coupling a projection CRT and an associated projection lens which pad readily lends itself to production installation, as well as to field replacement.

BRIEF DESCRIPTION OF THE DRAWINGS

The features of the present invention which are believed to be now set forth with particularity in the appended claims. The invention, together with further objects and advantages thereof, may best be understood with reference to the following description taken in conjunction with the accompanying drawings in the several figures of which like reference numerals identify like elements, and in which:

DESCRIPTION OF THE PREFERRED EMBODIMENT

Figure 1:
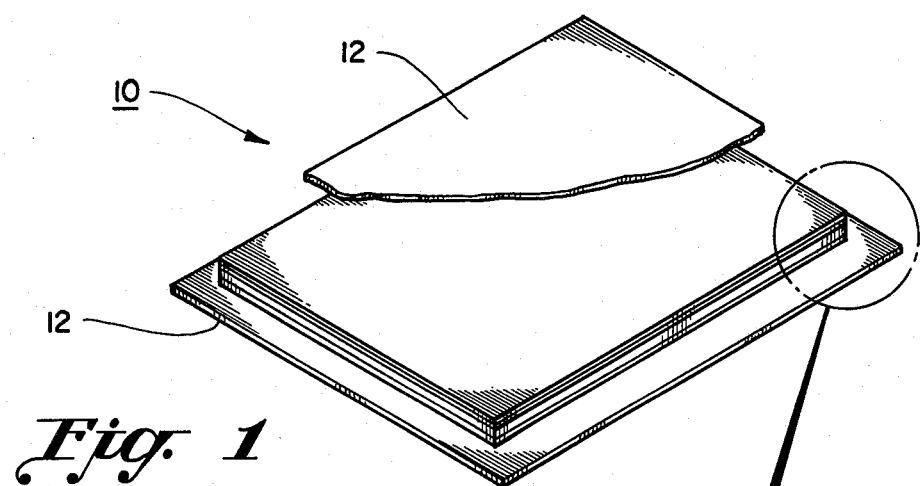
FIG. 1 is a perspective view of an optical coupling pad constructed in accordance with the invention.
Figure 1A:
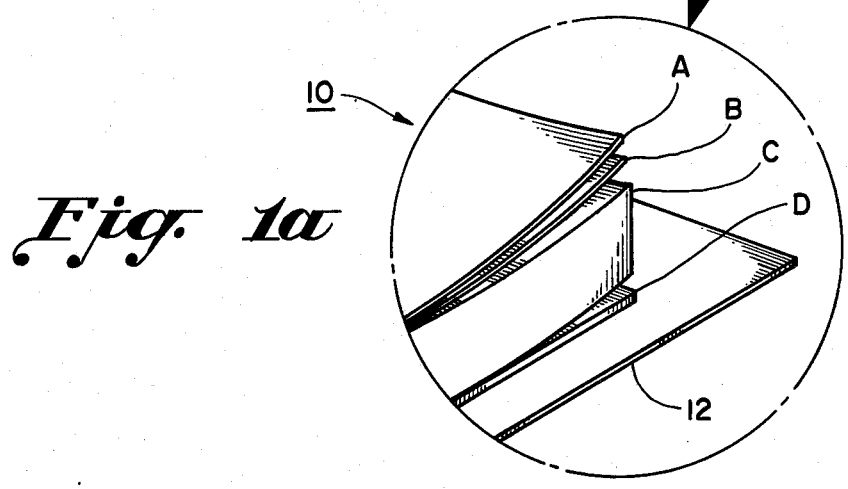
FIG. 1a is an expanded view of one corner of the coupling pad shown in FIG. 1 illustrating the layered construction of that pad.

FIG. 1 shows an optical coupling pad 10 constructed in accordance with the invention and which, prior to usage, is stored between a pair of protective covers 12, preferably formed of polypropylene or mylar. As best illustrated in FIG. 1a, pad 10 comprises a multi-layer device, in this embodiment, four layers which, for purposes of identification, are designated by the alphas A, B, C and D. For the application herein disclosed, pad 10 adapts a rectangular configuration having an aspect ratio corresponding to that employed in conventional projection television practice. The specifics respecting the geometry and constituency of the several layers are set forth in detail below.

Figure 2:
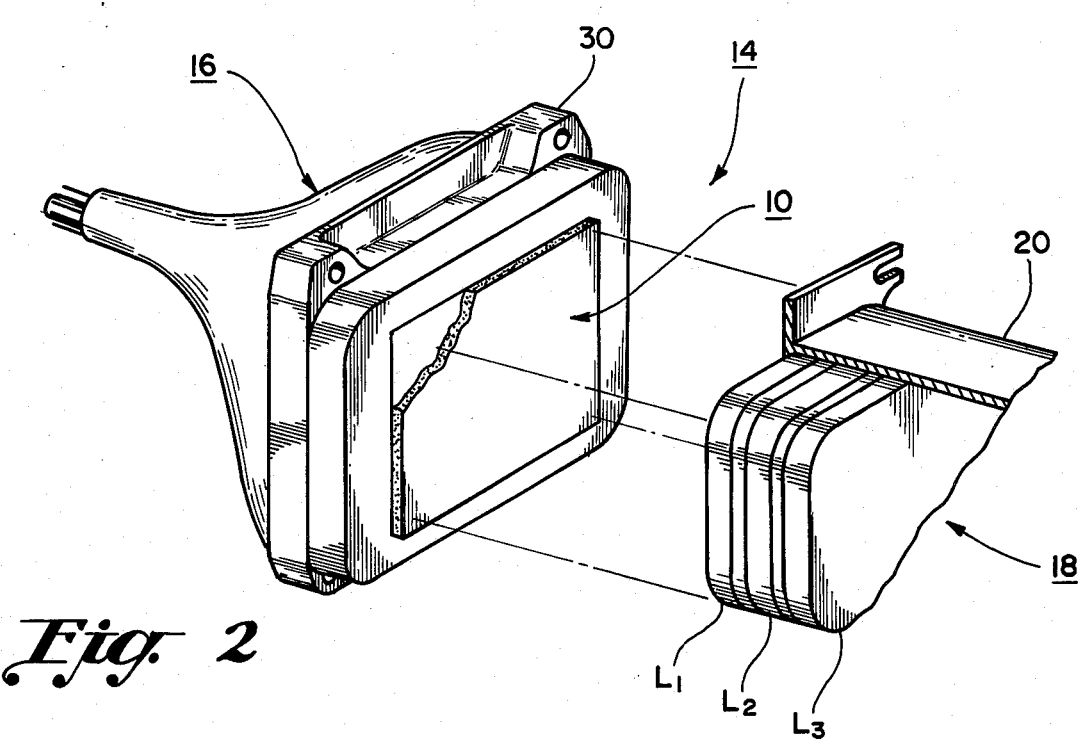
FIG. 2 is an exploded perspective view showing a liquid cooled CRT in association with a projection lens system.

FIG. 2 depicts a portion of an image projection system 14 comprising a projection type cathode ray tube 16, preferably a liquid cooled type reflecting the practice of the invention disclosed and claimed in the above-mentioned U.S. Pat. No. 4,405,949. The projection system 12 further includes an optical projector 18 comprising an assembly of lens elements L1, L2, Ln which are maintained in a collective array by a bracket 20.

Figure 3:
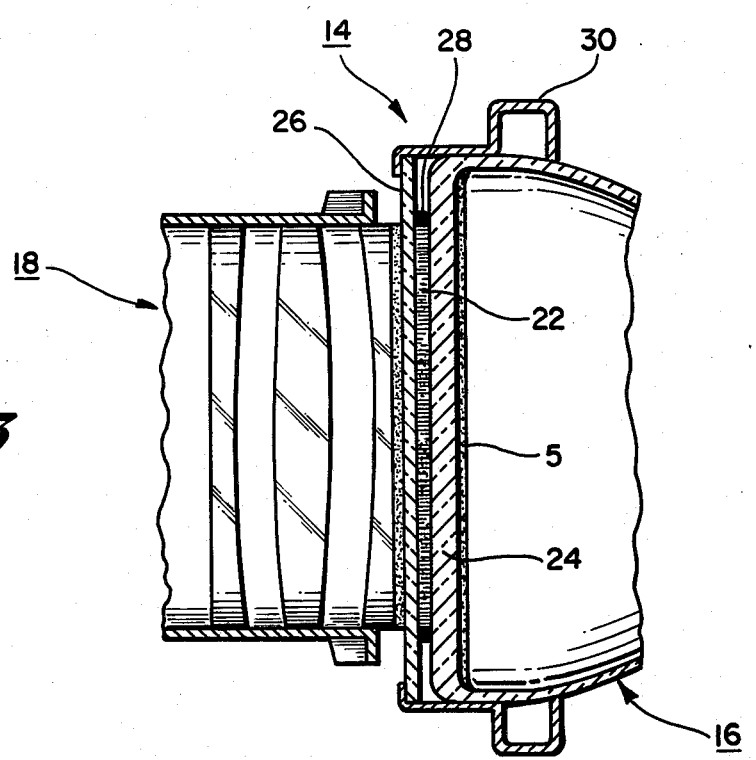
FIG. 3 is a sectional view of the projection CRT of FIG. 2 demonstrating the manner in which that tube is optically coupled to a projection lens by the pad shown in FIG. 1.

As best seen in FIG. 3, in order to reduce the operating temperature of the CRT's face panel, CRT 16 adopts a sandwich construction that serves to trap a quantity of cooling fluid 22 between the outer surface of the CRT face panel 24 and a window section 26. An electroluminescent screen S is affixed to the inside surface of face panel 24, which screen, when stimulated by a properly deflected and accelerated electron beam, develops an image that appears on the outer face of panel 24. With the image projection system arranged in the manner shown in FIG. 3, the image developed on screen S is then presented via cooling fluid 22, window 26 and pad 10 to the entrance element L1 of the lens assembly. While not specifically shown, it is understood that the geometric centers, or axes, of the CRT panel 24, window 26, pad 10 and lens element L1 are maintained coincident by appropriate mounting and clamping apparatus.

Figure 4:
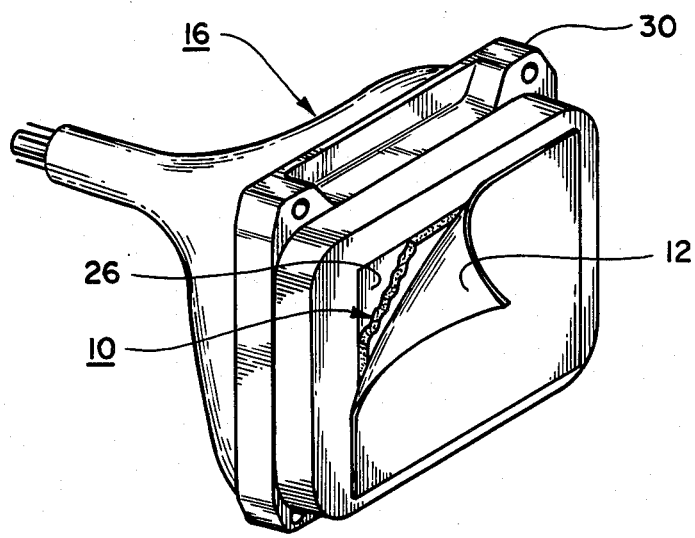
FIG. 4 is a perspective view of a liquid cooled projection CRT with the optical coupling pad of FIG. 1 in place.

In accordance with the invention, an improvement for reducing veiling glare and in improving the contrast of a projected image comprises a pad 10 which is applied to tube assembly 16 by positioning layer A of the pad in intimate contact with the tube's image display surface, which in this instance is the outside face of window 26. As shown in FIG. 4, a protector cover 12 is first removed from the pad and the pad is then positioned to cover the outside surface of window 26. When the pad has been firmly urged into contact with that window the remaining protective cover, overlying outer layer D, is then removed and the face of entrance lens element L1 is then urged into intimate contact with layer D of the pad. The thus assembled projection system 14 is then characterized by the arrangement shown in FIG. 3.

Among the advantages of pad 10 over other practices in the art is that all the components of the projection system, that is, the CRT, the lens and the coupling pad itself can be assembled and separated readily. The materials comprising the several layers of the pad, which will be detailed below, are selected to provide a good but peelable contact with the window 26, that is, the image display surface, and lens element L1 so that during manufacture, or subsequent field replacement of a faulty component of the projection system, the pad is readily peelable from the window and lens and replaced by a new pad when the new component is substituted for the faulty one.

Turning now to the constituents of the several layers of the pad, the properties required are that the pad be thermally stable, flexible, non-volatile, compressible and easy to handle. Some types of commercially available resins satisfy some of the requirements however, it has been determined that it is a combination of resins which are required to achieve the objects of the invention. Accordingly, and with reference to FIG. 1a, layers A and D are comprised of a Dow Corning 527 relatively hard, peelable silicon resin which is designed to effect a good contact with window 26 and with the face of lens L1, respectively, and thus eliminate any air pocket between that window and the lens. Desirably, layer A has a thickness of approximately 0.3 mm while layer D has a thickness of approximately twice that of layer A, or 0.6 mm.

Layer B is employed to afford mechanical tensile strength to the pad and to this end it is comprised of a Dow Corning silicon resin, designated Sylgard 184, to which contributes strength and rigidity to the pad. It has been found that a thickness of approximately 0.3 mm is sufficient for layer B.

Finally, layer C is comprised of a relatively thick layer, 3.3 mm, of Dow Corning relatively soft silicon resin 527. This thickness of resin affords the pad the property of compressibility which is necessary in order to compensate for any gap tolerances between window 26 and lens element L1.

While specific pad layer thicknesses and materials have been set forth, it is appreciated that materials having equivalent properties may well be substituted for those set forth above. It is significant that it is the layered construction in the approximate disclosed proportions that serve to achieve the objects of the invention. In an actual laboratory test, a pad constructed in accordance with this teaching effected a contrast ratio improvement of better than 2 to 1. Moreover, this pad alone has an optical transmission of approximately 94% at all visible wavelengths. The index of refraction of the pad is approximately 1.41 and it exhibits a compressibility of approximately 0.50 mm at 4.5 mm thickness.

What is claimed is:

1. In an image projection system comprising a projection type cathode ray tube for developing an image upon a display surface associated therewith, and an optical projector comprising a lens having an entrance element, the central axis of which is substantially coincident with the axis of said display surface, for projecting an aerial image of said developed image to a viewing screen, the improvement for enhancing the contrast of said projected image comprising:

means for effecting a direct optical coupling between said display surface of said tube and said lens element comprising a transparent, compressible, multi-layer, resin formulated pad for providing a close index of refraction match between said display surface and said lens element, said pad having a first outer peelable layer disposed in intimate contact with said image display surface and a second outer peelable layer disposed in intimate contact with said lens element to substantially preclude an air gap between said display surface and said lens element.

2. The improvement set forth in claim 1 in which said pad has an index of refraction of approximately 1.41.

3. The improvement set forth in claim 1 in which said pad has a compressibility of approximately 0.50 mm for an overall pad thickness of approximately 4.5 mm.

4. The improvement set forth in claim 1 in which said pad comprises four layers and in which said first and second outer layers are formed of a hard dielectric silicon resin, a third layer adjacent a first of said outer layers is formed of a silicon resin of predetermined tensile strength, and a fourth layer adjacent a second of said outer layers is formed of a silicon resin softer than said outer layers.

5. The improvement as set forth in claim 4 in which said first outer layer is formed of, approximately, a 0.3 mm thick equivalent of Dow Corning 527 silicon resin, said second outer layer is formed of, approximately, a 0.6 mm thick equivalent of Dow Corning 527 silicon resin,
said third layer is formed of, approximately, a 0.3 mm thick equivalent of Dow Corning Sylgard 184 silicon resin, and
said fourth layer is formed, of approximately, a 3.3 mm thick equivalent of Dow Corning 527 silicon resin.

* * * * *